April 19, 1960  F. P. ANDERSON ET AL  2,933,213
CONVERTIBLE ALL-PURPOSE COMMERCIAL VEHICLE
Filed Jan. 10, 1958  2 Sheets-Sheet 1
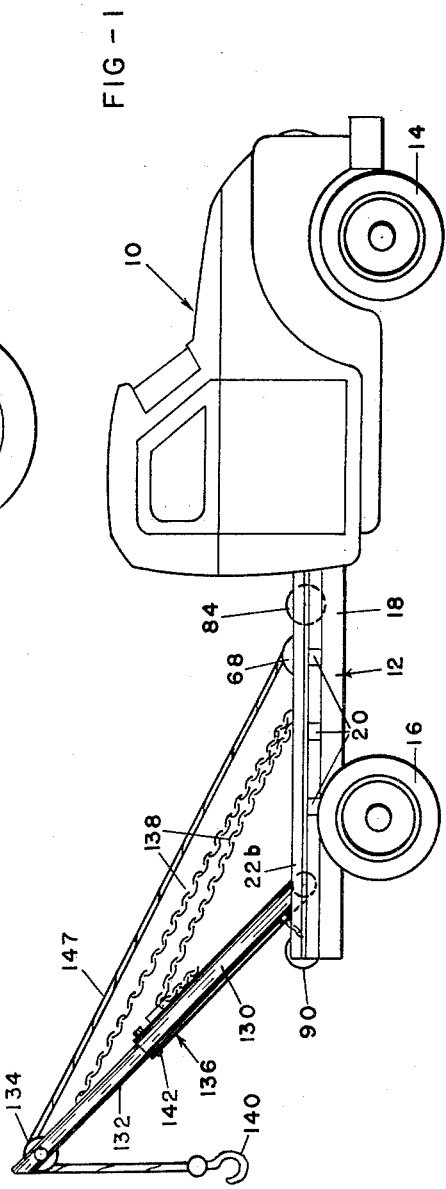
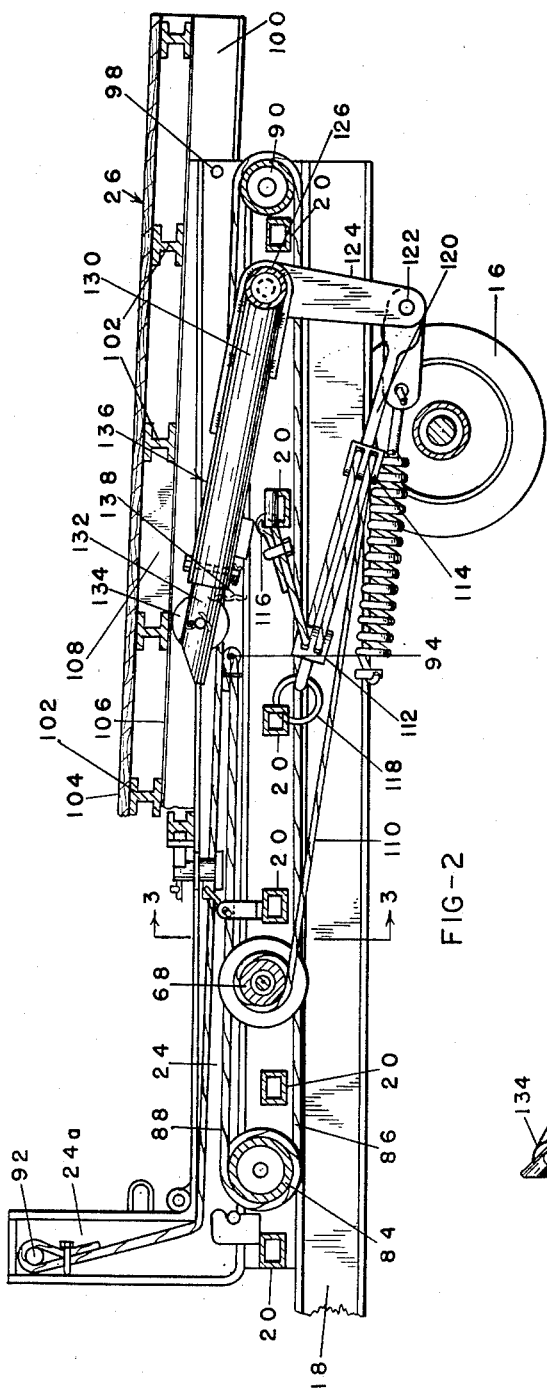
FRANK P. ANDERSON
EDWIN E. ANDERSON
RAYMOND L. ANDERSON
INVENTORS

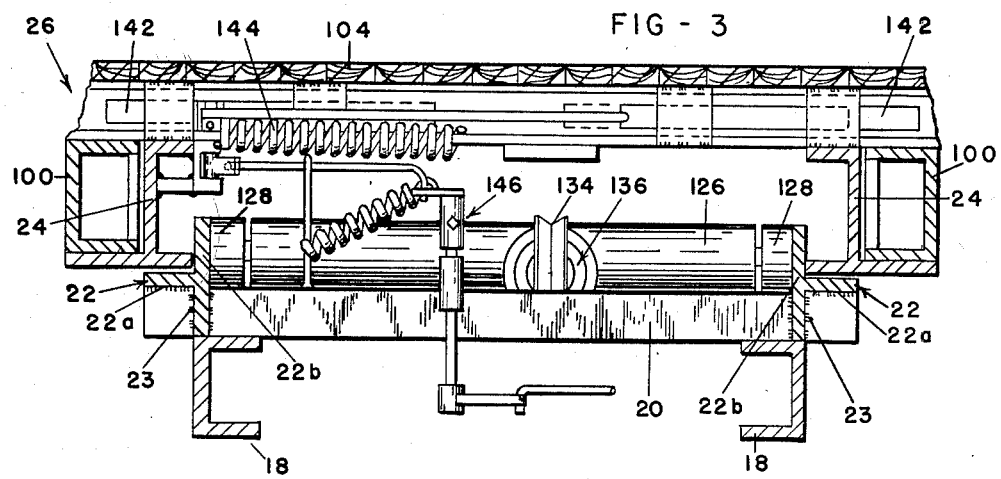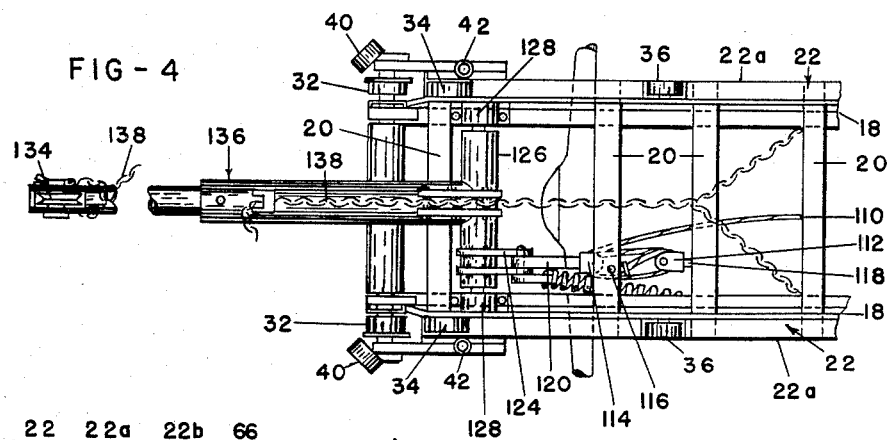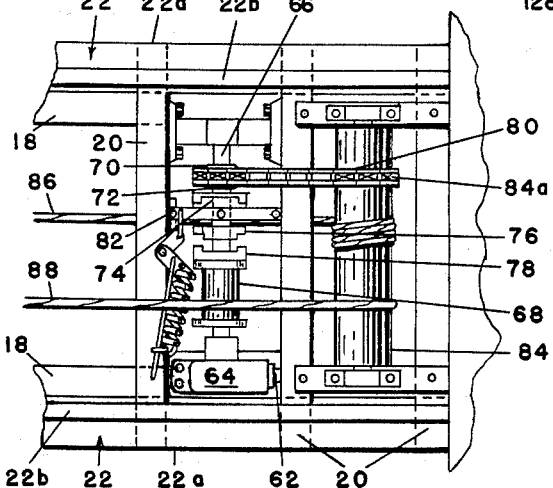

United States Patent Office 2,933,213
Patented Apr. 19, 1960

2,933,213

CONVERTIBLE ALL-PURPOSE COMMERCIAL VEHICLE

Frank P. Anderson, Edwin E. Anderson, and Raymond L. Anderson, Medical Lake, Wash.

Application January 10, 1958, Serial No. 708,214

2 Claims. (Cl. 214—517)

Our present invention relates to mobile vehicles which are convertible from one class of commercial vehicle to another, and more particularly relates to trucks of the motor vehicle type having a bed which may be selectively tilted to a dump position and also which may be removed from a truck chassis to rest upon the ground, and including a tiltable powered member for tilting said body and effective as a powered cable gin-pole when the body is removed from the chassis.

The present invention constitutes an improvement over our prior Patent No. 2,580,501 of January 1, 1952, and our co-pending application serially numbered 468,424, filed November 12, 1954, now Patent No. 2,811,269.

A principal object of our present invention is to provide an all-purpose commercial vehicle having a body which is convertible from a flat bed to a stake and to a box type body, and which is movable to a dump position from its normal horizontal position on the chassis, and also which may be removed from its normal horizontal position supported upon the chassis to a lowered horizontal position at rest upon the ground rearwardly of the chassis.

It is a further object of the invention to provide means for tilting the body to the dump position, and said means being effective for use as a hoist cable gin-pole when the body is removed from the chassis.

These and other important objects of the invention will be readily apparent to one during the study of the following specification when considered in conjunction with the accompanying drawings, wherein a preferred embodiment of the present invention is disclosed.

It will be understood, however, that the drawings are exemplifying only and are not intended to limit the invention beyond the scope particularly set forth in the appended claims. In the accompanying drawings wherein like numerals are employed to designate like parts:

Figure 1 is a side elevation of our improved truck and chassis with the body removed and showing the gin-pole in position effective to cooperate with the hoist cable;

Figure 2 is a fragmentary vertical cross section taken longitudinally through the truck chassis and showing the body tilted upwardly toward its dumping position and upon an enlarged scale;

Figure 3 is a lateral vertical cross section taken on the plane indicated by line 3—3 of Figure 2 but with the body in its normal horizontal position resting upon the chassis;

Figure 4 is a fragmentary plan view upon a reduced scale showing the chassis and the gin-pole in the position of Figure 1; and Figure 5 is a fragmentary plan view of the source of rotary power.

In the drawing, the truck is shown to include the cab 10, the chassis 12, and front and rear wheels 14 and 16. The usual longitudinally extending chassis channel bars 18 are laterally spaced and extend longitudinally of the chassis 12 and support the cab 10. Resting upon the chassis bars 18 we provide a number of crossbars 20 which extend beyond the lateral marginal limits of the chassis 12 and upon their end portions support longitudinally extending rails 22, one at each side of the chassis 12. It is easily seen that the rails are L-shaped in cross section and each has a horizontal lip 22a and a vertical flange 22b. The horizontal lips 22a rest upon the crossbars 20 and are secured thereto in any convenient manner such as by welding at 23. The vertical flanges 22b constitute guide means for cooperation with runners 24 which form a portion of the truck body 26.

The front end portions 24a of the runners are disposed vertically, as seen in Figure 2. It will be understood that the pair of runners 24 are laterally spaced coincident with the spacing of the rails 22 and the guide rail flanges 22b cooperate with the runners 24 to maintain the body in proper lateral relationship to the chassis during movement thereon. The runners 24 collectively constitute a frame which is movable onto and off of the chassis as is disclosed in our two above mentioned prior patents and will be enlarged upon hereinafter.

At their rearward ends, the runners 24 are supplied with a laterally extending pivot shaft 98 which pivotally supports laterally spaced bed rails 100. The rails 100 are tiltable from a position extending parallel to the plane of the chassis as seen in Figure 3 toward an angular dump position as seen in Figure 2.

The rails 100 support a plurality of laterally extending I-beams 102 upon which the decking 104 is applied to form the flat bed for the truck body. Although it is not shown, it is easily understood that the bed may be convertible from a flat bed to a stake truck or to a closed box in any conventional manner according to selection. Welded or otherwise secured under selected ones of the I-beams 102 is a longitudinally extending plate 106 to which is welded, between the deck 104 and the beams 102, gussets 108 to provide means for stabilizing the plate against deflection when pressure is applied thereto.

At their rear ends, the guide rails 22 are provided with flanged guide rollers 32 which are disposed in vertical planes coincident with the axes of their respective rails. The guide rollers 32 have their peripheral faces disposed rearwardly of the rails 22 and spaced below the upwardly presented horizontal plane of the lips 22a. Immediately forward of the guide rollers 32 we provide support rollers 34 which are coaxial with each other and are disposed in the planes of their common guide rollers. These support rollers 34 have their peripheral faces disposed upwardly spaced from said plane of the guide rail lips 22a for the purpose of supporting the runners 24 and preventing their sliding upon the lips 22a of the guide rails 22.

Intermediate the length of each rail 22 we provide other support rollers 36 coincident with the plane of the cooperating rollers of each rail. At their rear ends, the rails 22 are provided with rollers 40 journaled on horizontal axes to guide vertical movement of the vertical front end portions 24a of the runners 24. The other rollers 42 spaced forwardly therefrom and disposed on vertical axes prevent undue side movement of the body 26 during movement onto and off of the chassis 12 when in a tilted or angled position relative to the chassis.

Inspection of Figure 5 will reveal that we have provided a manually controllable source of rotary motion wherein the conventional power takeoff 62 from the truck transmission (not shown) is coupled with a power transmission and reduction mechanism 64 which is operably connected to rotate a laterally extending horizontal power shaft 66 journaled on the chassis 12. Journaled on the power shaft 66 and confined against movement axially thereof, we provide a cable drum 68 which has means (not shown) for releasably connecting a cable thereto. Also journaled on the power shaft 66 and fixed against movement axially thereof in spaced relation to the drum 68 we provide a motion transmitting element 70 which in the present disclosure includes a conventional chain sprocket and a clutch plate 74. Splined or otherwise secured to the power shaft 66 for rotation therewith intermediate the cable drum 68 and the motion transmitting element 70, we provide a clutch element 76, which is movable axially of the shaft 66 and rotatable therewith. The clutch element is adapted to alternately cooperate with the clutch plate 74 of the motion transmission element 70 and the clutch plate 78 of the drum 68 when disposed in its opposed positions. The clutch element 76 is shifted when lever 82 is moved laterally, thus alternately disposing the clutch element in coaction with the clutch plates 74 and 78. When the clutch element 76 is disposed in cooperation with the clutch plate 74, rotation of the power shaft 66 is transmitted to the sprocket 70 and a power transmission element 80, which is here shown to be a sprocket chain, is driven thereby.

A second cable drum 84 having means (not shown) for releasably securing the ends of cables thereto is journaled on the chassis 12 in parallel relation to the power shaft 66, and is spaced from the chassis forwardly thereof. Cable drum 84 is provided with a power transmission element 84a which is shown to be a sprocket and cooperates with the sprocket chain 80 to transmit rotary motion from the power shaft 66 to the drum 84 when the clutch element 76 is engaged with the clutch plate 74.

It will also be noted that we have cables 86 and 88 wound in opposite directions upon the cable drum 84. The cable 86 operates as a removing cable and extends longitudinally of the truck under crossbars 20 and under a cable guide roller 90, journaled on a horizontal laterally extending axis at the rear end of the chassis 12. From thence it extends forwardly and thence upwardly and is secured to the upper ends of the vertical front end portions 24a of runners 24 at 92.

We have shown a single cable 88 which is a body loading cable. However, two or more will be equally effective in some circumstances. Cable 88 is wound in the opposed direction to that of 86 on the drum 84, and extends above the cross bars 20 and over the cable guide roller 90, and is secured under the body 26 as seen at 94 to a runner 24. It will thus be seen that by actuating drum 84 in one direction wherein cable 86 is wound thereon, cable 86 pulls the body 26 rearwardly off of the chassis 12 and as the body tilts over the rollers 32 and 34 the cable 88 tautens to prevent its dropping to the ground unhindered. Continued winding of cable 86 and subsequent unwinding of cables 88 then permits the forward portion of the body 26 to lower at the end of the chassis by gravity. Counter rotation of drum 84 will cause cable 88 to wind, and lift the front end of the body 22 onto the chassis and pull it forwardly thereon to the full line position of Figure 1.

As adequately disclosed in our prior Patent No. 2,580,501, the body and guide rails include mechanisms for anchoring the body onto the chassis when in the normal position and thus prevent accidental displacement thereof.

The first cable drum 68 is provided with a cable 110 which is wound thereon as seen in Figure 2 and extends rearwardly through a pair of blocks 112 and 114 and is thence secured at 116 to a selected one of the crossbars 20. The block 112 it secured at 118 to a crossbar 20 while the block 114 has an arm 120 pivotally secured at 122 through a right angle arm 124 welded or otherwise rigidly secured to a laterally extending rotatable arbor 126 journaled in bearings 128 carried by the chassis 12. It will thus be seen that as the drum 68 is rotated to wind the cable 110 it cooperates with the blocks 112—114 to operate as a block and tackle, greatly increasing the power applied to the arm 24 to rotate the arbor 126.

Midway its length, the arbor 126 is provided with a radially extending cylindrical tube 130 which has a telescopically associated portion 132 provided with a cable pulley or sheave wheel 134 journaled in its free outer end for rotation in a vertical plane. This structure constitutes a gin-pole indicated in its entirety by the numeral 136 which is movable from a normal horizontal position parallel to the chassis as shown in Figure 3 to an angular position as shown in Figure 2, the purpose of which is to tilt the body 26 from its normal horizontal position to the tilted dumping position. It will be seen that the cable pulley 134 bears against the plate 106 during this movement which is imparted by means of rotation of cable drum 68 through the block and tackle system 110—114.

When the body 26 including the frame 24 is removed from the chassis 18 as seen in Figures 1, 4, and 5, the gin-pole may be pivoted substantially less than 130 degrees from its normal horizontal position and yet more than 90 degrees therefrom to an angular position as shown in Figure 1, wherein we provide means 138 for supporting the gin-pole so that an additional cable 147 operably connected to the drum 68 may be trained over the cable pulley 134 and a hook or other implement 140 may be applied to its outer end to effectively employ the gin-pole as a hoist. It will be noted that the support means 138 are chains which secure at their inner ends to the chassis 18 of the vehicle and at their outer ends respectively to the cylindrical tube 130 and the telescopic portion 132. A bolt 142 is removably applied to effect selective telescopic positioning of the telescopic portion 132 with respect to the cylindrical portion 130.

In Figure 3 we have shown automatic locking means which comprises a pair of laterally slidable latch bars 142—142 which by means of spring 144 are normally disposed in the full line position, so that the bed rails 100 cannot tilt upwardly, but when the lever 82 is shifted to engage the clutch 76 with the member 78, the linkage 146 is effective to withdraw the latch bars 142 to their dotted line positions and thus release the bed rails 100 so that the bed may tilt by action of the gin-pole 136.

Having thus described our invention, we claim as new and desire to secure by Letters Patent of the United States the following:

1. A convertible all-purpose commercial vehicle comprising the combination of a mobile vehicle chassis, and a powered winch having independently operable cable drums thereon; of a frame movable longitudinally of the chassis from a normal horizontal position supported upon the chassis to a lowered horizontal position at rest upon the ground back of the chassis, cable means for shifting the frame longitudinally off of and onto the chassis and powered by said drums, a vertically tiltable body pivotally supported on said frame at its rearward end for tilting movement about a horizontal axis disposed laterally of said chassis, a gin-pole pivotally supported on said chassis at its rearward end for tilting movement about a horizontal axis disposed laterally thereof, and cable means effective for tilting said gin-pole according to manual selection to tilt said body when said body is disposed upon said chassis.

2. A convertible all-purpose commercial vehicle comprising the combination of a mobile vehicle chassis, and a powered winch having independently operable cable drums thereon; of a body movable longitudinally of the chassis from a normal horizontal position supported upon the chassis to a lowered horizontal position at rest upon the ground back of the chassis; said body also being pivotally supported for tilting movement about a horizontal axis disposed laterally of the chassis at its rearward end when the body is in its normal position; a gin-pole pivotally supported on said chassis at its rearward end for tilting movement from a position parallel to the plane of the chassis upwardly more than 90 degrees about a horizontal axis disposed laterally of said chassis, and cable means selectively powered by said drums and effective to shift the body longitudinally off of and onto the chassis and alternately to tilt said gin-pole to tilt said body.

References Cited in the file of this patent

UNITED STATES PATENTS

| | | |
|---|---|---|
| 1,944,063 | Brauner | Jan. 16, 1934 |
| 2,264,216 | Milligan | Nov. 25, 1941 |
| 2,553,454 | Hinke | May 15, 1951 |
| 2,679,433 | Wasinger | May 25, 1954 |
| 2,789,715 | Filipoff | Apr. 23, 1957 |